June 29, 1954 J. DUNGLER 2,682,116
METHOD AND APPARATUS FOR TREATING FIBROUS SHEET
MATERIAL BY SUPERHEATED STEAM OR VAPORS
Filed Jan. 21, 1950 5 Sheets-Sheet 2
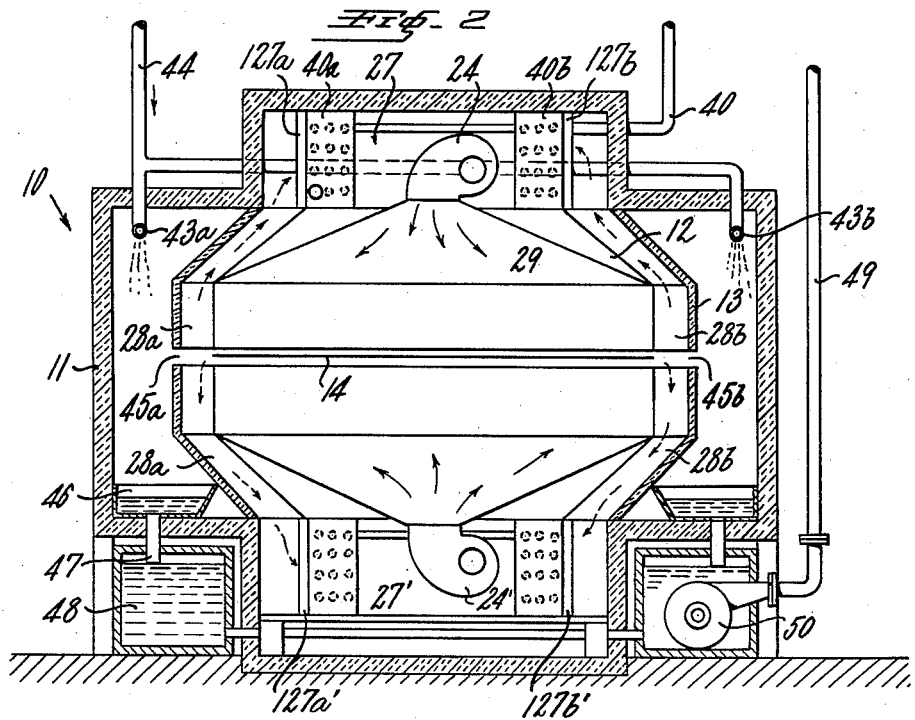
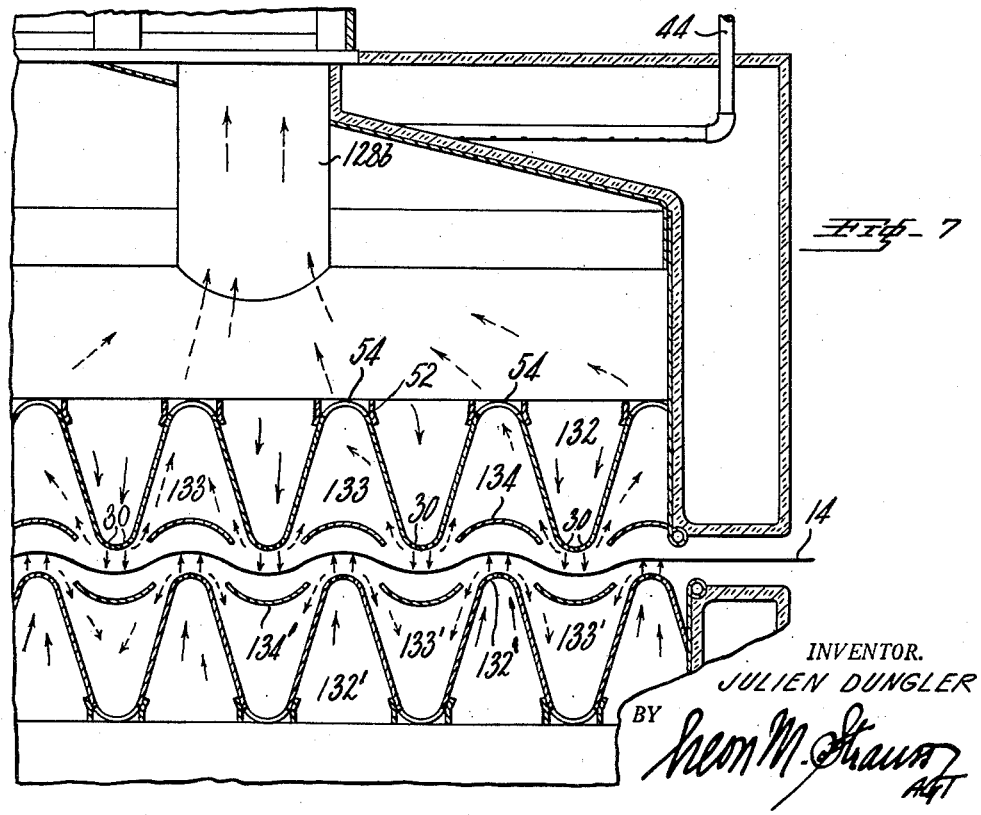
INVENTOR.
JULIEN DUNGLER
BY

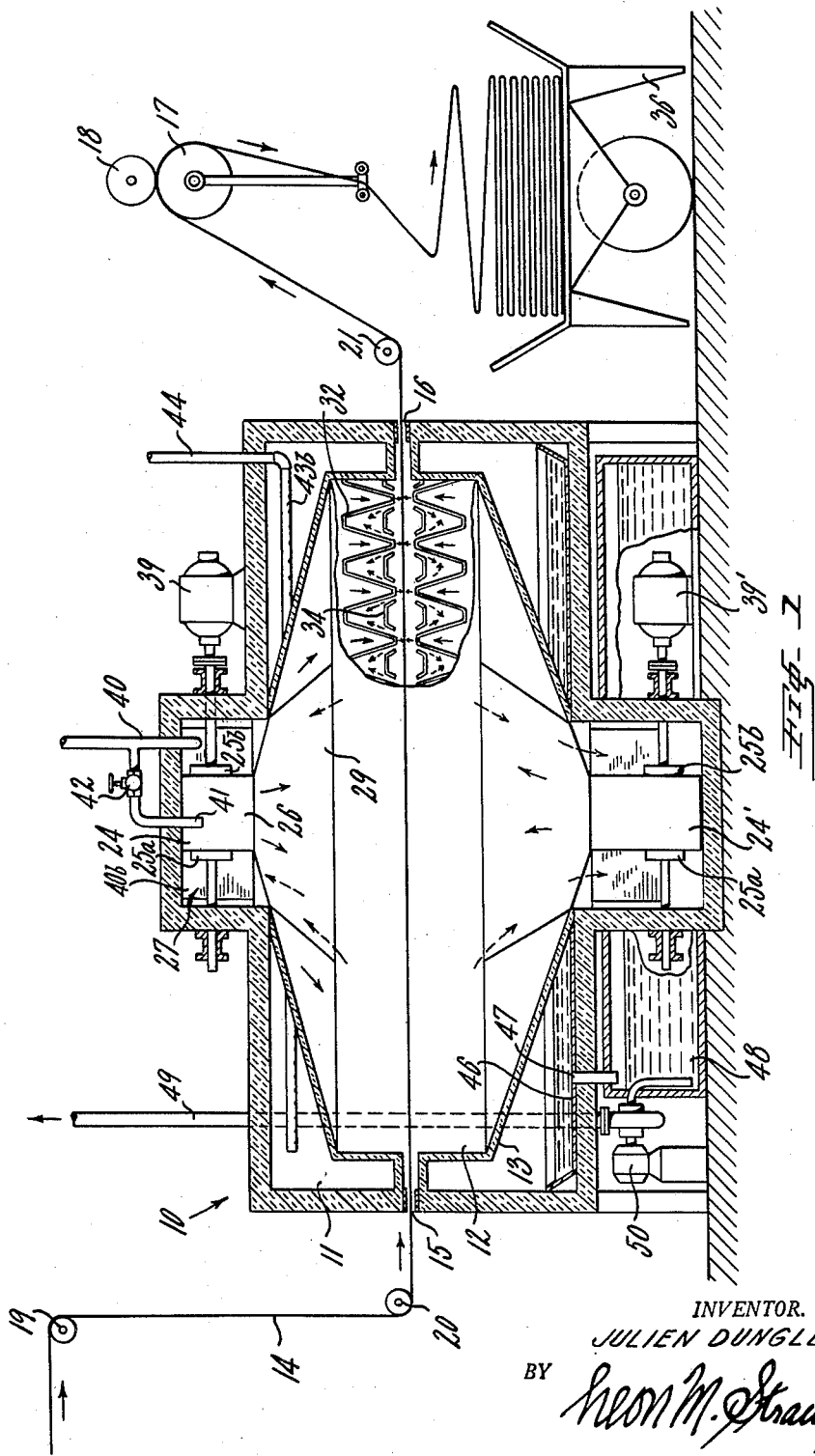

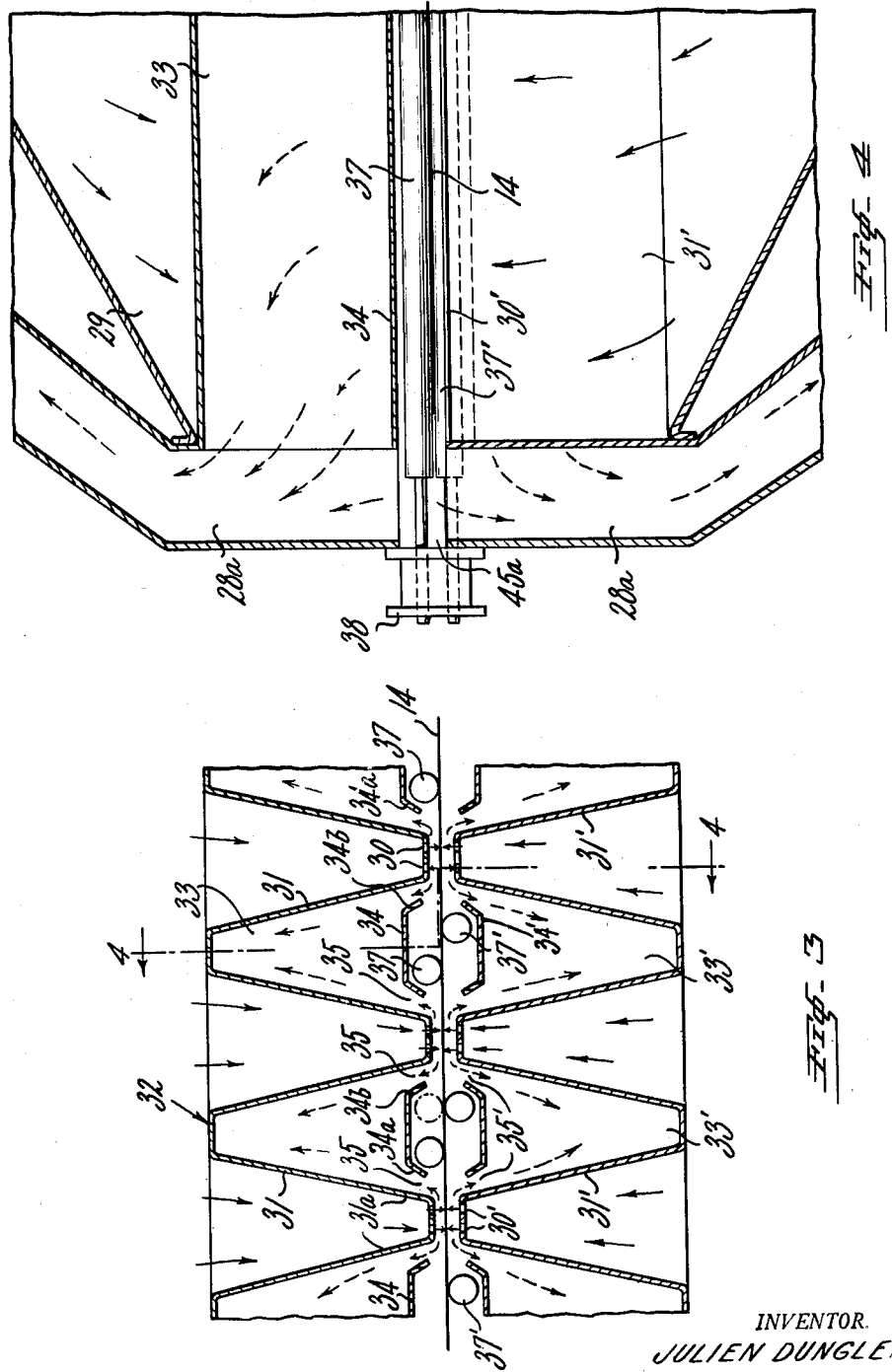

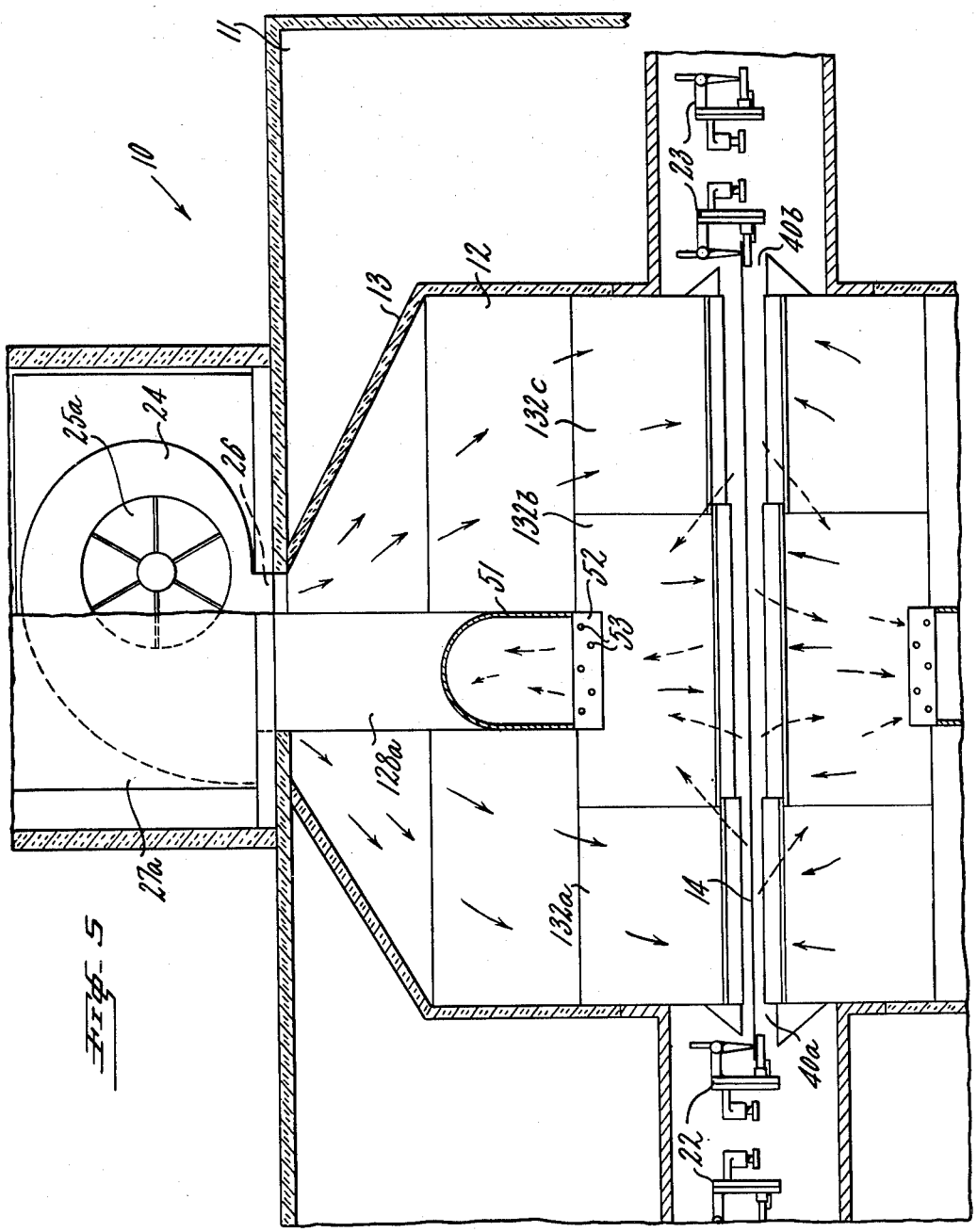

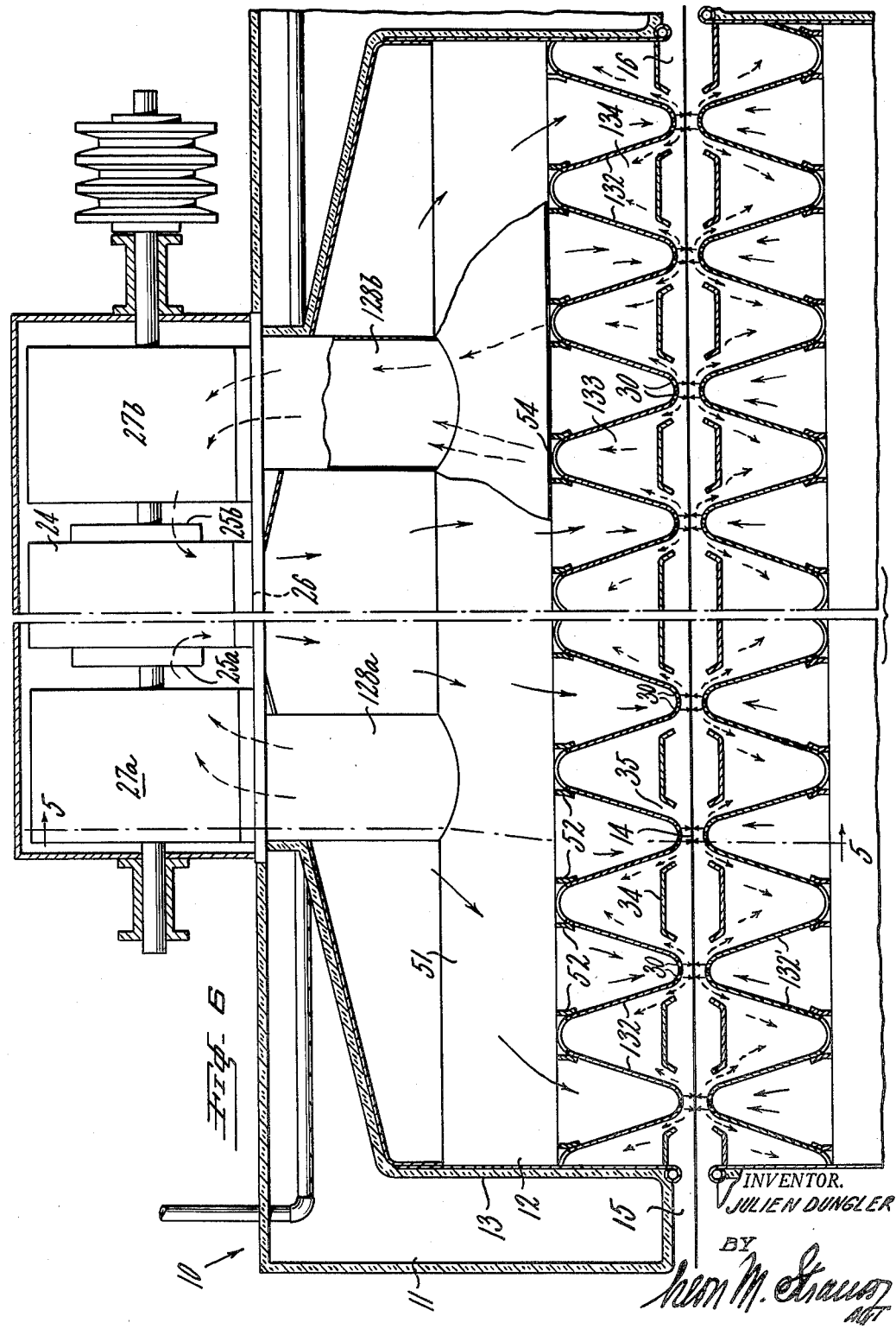

Patented June 29, 1954

2,682,116

UNITED STATES PATENT OFFICE 2,682,116

METHOD AND APPARATUS FOR TREATING FIBROUS SHEET MATERIAL BY SUPERHEATED STEAM OR VAPORS

Julien Dungler, Basel, Switzerland

Application January 21, 1950, Serial No. 139,946

9 Claims. (Cl. 34—23)

The present invention relates to method and means for drying in a continuous operation endless or lengthy web material, such as textile, paper and other fibrous or cellulose products, the method involving the discharge of streams of drying fluid at high velocity upon the surface of the product under treatment.

In drying machines useful for the purposes of the invention advantage may be taken of the static pressure, the dynamic pressure, or of a combination of such static and dynamic pressures of the drying fluid (which may be superheated steam and/or super-heated vapor of a liquid— other than water) to thereby cause impingement of said fluid on the product or material under treatment, said fluid being directed with such force and velocity as to penetrate the surface of the material into the very heart thereof where said fluid transfers part of its heat (calories) to the liquid contained in the fibers of said material, which liquid is to be driven off. The liquid as well as the material are thus instantaneously heated to the boiling point of the liquid, which is subjected to evaporation.

The force of penetration is, of course, proportional to the velocity of the fluid which in turn is determinative of an increased production capacity. The static pressure as well as the dynamic pressure of the active fluid, and the depression produced by the suction operation of the fan means are utilized according to the invention to effectuate maximum velocity of the drying fluid.

The vaporization of the liquid to be removed or driven off from the material treated is facilitated and caused to occur more rapidly and at relatively lower temperature if the ambient pressure at the surface of the material is low, preferably below atmospheric pressure. From these considerations it will be apparent that maximum efficiency will be obtained by combining a higher nozzle pressure with a low pressure adjacent the surface of the material.

In accordance with the invention advantage can thus be taken of the pressure difference resulting from the total pressures prevailing at the location of the return flow of the fluid from the material and at the location at which the suction effect occurs.

It is, therefore, an object of the invention to provide means establishing in or adjacent the zone of the blowing nozzles which emit the drying fluid a depression or vacuum effect whereby the fluid velocity in that zone may be increased or changed in accordance with the suction produced by the exhaust fan for the used fluid.

Another object of the invention is to provide means obstructing partly the admission into and flow of fluid through the exhaust channels of the drying machine to thereby obtain a change of the vacuum or depression in said exhaust channels.

Yet another object of the invention resides in the provision of means intensifying penetration of the drying fluid into the material under treatment.

Still another object of the invention is to provide means permitting exhaust passageways and adjacent orifices of the fluid-blowing nozzles of the new drying machine (whether equipped with telescopic nozzles or not) to be disposed in predetermined relationship to one another to thereby increase the economic output of the machine to a considerable degree.

In accordance with the invention it is desirable to limit the flow of fluid to a minimum in order to maintain the same at maximum speed at its return flow as well as at its entry into the exhaust channel means.

A further object of the invention resides in the provision of means ensuring fast starting of the drying machine operation, reduction of losses of calories to a minimum and maintaining a more elevated mean temperature without the necessity of actually increasing the temperature of the heat exchangers.

It is another object of the invention to provide means facilitating the evacuation of excess vapors caused by evaporation of the treatment fluid and the guidance of such vapors into the condensation zone or chamber.

Still a further object of the invention is to provide means preventing chafing or any other undesirable contact between the fabric or like material and the nozzles discharging the treatment fluid, notwithstanding the fact that the material may be tensionless in transverse and longitudinal directions along its path of travel through the machine.

A further object of the invention is to provide means rendering possible the removal of excess pressure from the drying or treatment chamber proper of the machine to a chamber surrounding said treatment chamber, whereby also undesirable odors, for example, caused by polymerization within the treatment chamber will be prevented from directly entering the workroom or space in which the drying machine is erected.

Another object of the invention is to provide means permitting recuperation of escaped or removed vapor in one of two chambers, drums or like confines, preferably exteriorly disposed with respect to the other and relatively remote from the material under treatment.

Still another object of the invention is to provide means contributing to an improved hand or feel of the fabric and similar material.

An important object of the present invention is also to provide, in cloth drying, dyeing, scouring, bleaching and like apparatus, means reducing the fluid pressure along the surface of the material to be treated, whereby many advantages will be attained and utilized, without enlarging the dimensions or volume of a given apparatus or machine.

Another object of this invention is to provide means increasing economy and production efficiency of cloth and like drying systems or machines by reducing the volume of fluid to be circulated.

A further object of the invention is to provide means utilizing the thermal energy of a part of the fluid which is diverted from circulation through the nozzles of the apparatus.

Still another object of the invention is to provide means ensuring the establishment of a predetermined treatment atmosphere at a surface portion of the material so that the latter is alternately exposed to the impingement of drying fluid and to a partial vacuum while the permeating liquid in the material is subjected to vaporization.

Yet a further object of the invention is to provide means contributing to an efficient guidance of the cloth or other cellulose material through the drying machine and at a minimum distance from the orifices of the blowing nozzles thereof through which the drying fluid is discharged.

The above and other objects and advantages of the invention will become apparent from the following description of certain embodiments, reference being had to the accompanying drawings.

In the drawings:

Fig. 1 is a longitudinal, sectional view (partly schematically shown) of an apparatus according to the invention;

Fig. 2 is a cross-sectional view of the apparatus shown in Fig. 1;

Fig. 3 is a fragmentary, sectional view of the nozzle arrangement, drawn on an enlarged scale, of the drying chamber forming part of the apparatus of Fig. 1;

Fig. 4 is an enlarged, sectional view taken along line 4—4 of Fig. 3;

Fig. 5 is an enlarged section taken on line 5—5 of Fig. 6;

Fig. 6 is a longitudinal cross-section of a modified form of a drying chamber embodying the invention, parts being broken away; and Fig. 7 is a fragmentary, sectional view similar to the right hand portion of Fig. 5, illustrating a further modification.

Referring now more particularly to Figs. 1–4 there is shown a drying apparatus or machine 10 comprising an outer insulated chamber 11 and an inner or drying chamber 12, the two chambers being separated by thermally insulating walls 13. A piece of material to be dried, such as lengthy cloth material 14, enters the apparatus 10 at inlet slot 15 and leaves at outlet slot 16; thereby effectively dividing the chamber 12 into an upper and a lower half. The material 14 is advanced through the chamber by suitable feed means, indicated schematically as feed roller 17 cooperating with presser roller 18, and is held in position by guide rollers 19, 20, 21 and gripping devices 22, 23 (Fig. 5); the dried cloth 14 is deposited in a wagon at 36.

Positioned centrally of the upper and lower halves of the chamber 12 are a pair of blowers 24, 24' of which only the upper blower 24 will be referred to herein, the two chamber halves and the respective blowers being substantially identical. Blower 24 has a pair of intake or suction ports 25a, 25b, one on each side, and a discharge or high-pressure port 26. The suction ports 25a, 25b open into a heating chamber 27 which in turn communicates with a pair of lateral ducts 28a, 28b. A funnel-shaped duct 29 connects the discharge port 26 of blower 24 with the orifices 30 of a set of nozzle elements 31 (Fig. 3) forming part of corrugated conduit means 32. Between the nozzle elements 31 there extends a set of trough-shaped canals 33 which, at their ends communicate with the lateral ducts 28a, 28b, as best seen in the upper portion of Fig. 4.

Disposed adjacent the cloth material 14 within each of the canals 33 is a respective baffle or guide plate 34 extending substantially parallel to the path of the material 14 and so positioned as to provide passageways 35 between the lateral ends 34a, 34b of baffle plates 34 and the adjacent end walls 31a defining nozzle elements 31, the size of these passageways being properly correlated with those of the orifices 30 of the nozzles to insure the existence of a predetermined pressure drop across the aforesaid openings. The baffle or guide plates 34, 34' may be adjustable or pivotally supported (so as to change cross-sections of passageways 35, 35') and should preferably be dish-shaped to accommodate guide and supporting rollers 37, 37' for the cloth 14. The shafts of said rollers are journaled in bearings 38 (Fig. 4).

Rollers 37, 37' may be rotated and positively driven from any suitable source of power (not shown). As seen in Fig. 1, blowers 24, 24' are driven from associated motors 39, 39', respectively, and through the heating chamber 27, live steam passing through suitable heat exchangers 40a, 40b may be circulated. A branch conduit 41, fed from main conduit 40 of the steam-circulating system via a shut-off valve 42, extends into heating chamber 27 for the admission of steam into chamber 12 at the beginning of operations, the purpose of this step being substantially complete elimination of air from the interior of the chamber 12 before the drying operation starts.

Sprinkler tubes 43a, 43b communicate with a cold water inlet tube 44 and extend within the outer chamber 11 which communicates with the inner chamber 12 at slots 45a, 45b. A basin 46 on the bottom of chamber 11 gathers the liquid condensate (produced in the manner subsequently described) and delivers it through a drain pipe 47 to a tank 48 whence it is discharged through an outlet pipe 49 by a pump 50.

The operation of the aforesaid apparatus is as follows:

After the atmospheric air inside the chambers 11 and 12 has first been removed and replaced by superheated steam or vapor which is introduced through the valve 42 from conduit 40, the valve is closed and the motors 39, 39' are energized to drive the blowers 24, 24', the previously impregnated cloth 14 (e. g. impregnated with monomeric resinous solution, such as urea-formaldehyde, or other known thermoplastic or thermosetting resinous substance) or previously moist cloth 14 (moist with coloring matter) being at the same time advanced from the inlet slot 15 to the outlet slot 16, as hereinabove indicated. Superheated steam leaving the discharge ports of the blowers 24, 24' at high velocity reaches the orifices 30, 30' of nozzle elements 31, 31' and through them impinges upon both surfaces of the cloth material 14; this is indicated by the solid arrows which in all views indicate the movement of the drying fluid under pressure.

At the same time a partial vacuum is created in the canals 33, 33' which causes a mixture of the treatment or working fluid (e. g. superheated steam) after impingement thereof on the material, with fluid emanating from liquid contained in and evaporating from the material 14, to flow through the aforesaid predetermined passageways 35, 35' and thence, by way of ducts 28a, 28a', and 28b, 28b' through suitable fifilters 127a, 127b; 127a', 127b' toward the intake ports 25a, 25b and 25a', 25b' of blowers 24, 24', respectively; on passing through the heating chambers 27, 27' the mixed fluids or vapors are heated to a desired temperature before being recirculated by the blowers. The return flow of fluid under suction is indicated in all the views by broken arrows.

It should be noted that, with this drier hereinabove disclosed, the blowers are not required to recirculate the entire volume of fluid present within the chambers 11 and 12, but only a comparatively small fraction thereof which passes substantially directly, after striking the material 14, from the discharge orifices 30, 30' to the suction passageways 35, 35' as best seen in Fig. 3. It will thus be understood that, using blowers of a given capacity, a considerably more rapid circulation of the working fluid and, therefore, a more intense drying effect will be obtained.

Since, however, the amount of circulating fluid tends to increase constantly as the result of the continuous evaporation of impregnating liquid, it is necessary to provide for the removal of the excess mixed fluid (with superheated steam) which, through passages 45a and 45b, finds its exit into the outer chamber 11 which is not included in the path of circulation. This excess fluid is still the carrier of a substantial quantity of useful energy, in the form of effective and latent heat, and may therefore serve as a source of thermal energy for any practical purpose, incidental to its removal from the chamber 11. Thus, the invention proposes to convert the condensation heat of the excess vapor, as a preferred mode of utilization, into sensible heat of a suitable carrier, such as water, which for this purpose is injected into the chamber 11 by way of conduit 44 and fine sprinkler devices 43a, 43b.

It is known that the latent heat of every kilogram of steam is capable of heating five liters of water to a temperature of about 90° C., hence by the admission of four liters of cold water for every liter of water evaporated from the cloth material 14, it will be possible to obtain five liters of water heated almost to the boiling point. This water, as shown in Figs. 1 and 2, is then gathered in basin 46 within the chamber 11 and escapes into the tank 48 whence it is delivered by means of pump 50 to any suitable load (not shown), for example, a heater for reconverting this water into steam and circulating it through the pipes 40a, 40b of the heat exchanger. It may also be mentioned that the presence of a jacket of the aforesaid vapors surrounding the inner chamber 12, will effectively add to the thermal insulation of the same with respect to the surrounding atmosphere, thereby further increasing the efficiency of the apparatus.

In the modification shown in Figs. 5 and 6, the heating chamber 27 has been replaced by two chambers 27a, 27b, each open toward a respective suction port 25a, 25b of blower 24, these chambers being connected by way of respective ducts 128a, 128b with a horizontally extending duct 51. The latter duct is broken open at its underside at spaced intervals to form depending flaps 52 which are riveted or otherwise secured, as indicated at 53, to walls of exhaust canals 133, the nozzle and exhaust canals 132, 133 being of the telescopic type comprising one stationary portion 132b and two telescopic portions 132a and 132c, as best seen in Fig. 5, so that the effective length of the drier may be varied to suit the width of the cloth material 14. Such telescopic drier arrangement has become known by U. S. Letters Patent No. 2,495,163.

The tips of the canal pieces 133, situated between pairs of flaps 52, are apertured as at 54 to allow for the passage of fluid into the duct 51 from the canals 133, this movement being the result of the partial vacuum existing in these canals on account of the suction exerted by blower 24. It should be noted that, apart from the modifications just mentioned, the arrangement of Figs. 5 and 6 is similar to that shown in Figs. 1-4 and the same reference numerals have been used for the remaining elements; the orifices 30 communicate directly with the supply port 26 of the blower by way of the chamber 12.

In the modification of Fig. 7, the nozzles 132, 132', are not aligned as in Fig. 6 but have been arranged in staggered relation so that each nozzle unit 132 is situated opposite a canal unit 133' while each nozzle unit 132' is opposite canal unit 133. The advantages of this arrangement are that, if cloth 14 is held under little or no tension (in case of overfeed) in lengthwise and transverse direction thereof, pressure from the upper discharge orifices 30 of nozzle unit 132 will not combine with the weight of the cloth to force the latter against the lower nozzles 132', so that undesirable rubbing or chafing of the material is effectively avoided. As indicated in Fig. 7, the tensionless cloth will assume a wavy appearance, determined by the play and counterplay of the fluid pressure and vacuum areas which will maintain it well spaced from contact with the nozzles as well as from the baffle or guide plates 134, 134' which, for this reason, are preferably of arcuate form.

It is further to be noted that the series of oppositely disposed nozzles may be arranged as closely as possible to the traveling cloth or like cellulose material without the danger of causing undesired contact of the nozzle orifices with the cloth material under treatment. Also, in particular in the case of fine cloth, the partial vacuum on one of its surfaces will more effectively support the pressure of the fluid impinging upon the other surface thereof at directly opposite locations, thereby not only imparting maximum nozzle velocity to the fluid but also causing it to pass directly through the cloth for the greatest drying effect possible.

It can thus be seen that there has been provided in accordance with this invention a method for drying fibrous sheet material by exposing same to a heated fluid under pressure, which method comprises the steps of directing said fluid upon a certain portion of the surface of said material, and simultaneously creating a partial vacuum along an adjacent portion of said surface.

Although the invention has been described with reference to certain specific embodiments thereof, it is to be distinctly understood that various modifications and adaptations of the arrangements herein disclosed may be made as may readily occur to persons skilled in the art without constituting a departure from the spirit and scope of the invention as defined in the objects and in the appended claims.

Having thus described the invention, what is claimed as new and desired to be secured by Letters Patent, is:

1. An apparatus for drying elongated fibrous material, comprising an inner chamber, an outer chamber surrounding said inner chamber, mechanism for displacing said material along a predetermined path inside both said chambers, a plurality of nozzles transversely positioned along said path and forming passages therebetween, blower means inside said inner chamber having an intake side and a discharge side, first conduit means connecting said discharge side with said nozzles, second conduit means connecting said intake side with said passages, heater means in at least one of said conduit means for bringing a fluid circulated by said blower means to a temperature above the boiling point of a liquid permeating said material, thereby causing said liquid to be vaporized, said inner chamber being provided with an aperture allowing for the flow of excess vapors from said inner chamber into said outer chamber, and means receiving said excess vapors and connected with said outer chamber.

2. An apparatus according to claim 1, wherein said inner chamber has a pair of opposite walls substantially parallel to said path, provided with apertures opening into said outer chamber, said inner chamber further comprising a plurality of baffle plates, one in each of said passages and extending toward said opposite walls and forming a plurality of transverse channels between said material and said baffle plates, said channels terminating at said apertures.

3. An apparatus according to claim 2, including roller means disposed in said transverse channels.

4. An apparatus according to claim 1, wherein said receiving means include sprinkler means for dispersing a liquid to be heated inside said outer chamber, collector means for gathering the heated liquid, and means for supplying same from said outer chamber therewithout.

5. An apparatus for continuously drying elongated fibrous material, comprising a drying chamber, blower means inside said chamber having an intake side and a discharge side, mechanism for displacing said material along a predetermined path inside said chamber, a plurality of exhaust canals spaced along said path, a plurality of inlet canals spaced along said path and positioned intermediate respective ones of said exhaust canals, said inlet canals terminating each in orifices forming nozzles for fluid discharge, first conduit means connecting said discharge side with said exhaust canals, second conduit means connecting said intake side with said inlet canals, heater means in at least one of said conduit means for bringing a fluid circulated by said blower means above the boiling point of liquid permeating said material to thereby cause said liquid to be vaporized, baffle means positioned in each of said exhaust canals and including at least one suction passageway, the size of said suction passageway being properly correlated with that of said orifices to ensure the existence of a predetermined pressure drop across said orifices and said suction passageway of said baffle means, and a condensing chamber in communication with said drying chamber and insulating the latter, said drying chamber and said condensing chamber having an insulating wall common to both said chambers.

6. An apparatus for continuously drying elongated fibrous material containing a liquid substance, comprising a drying chamber, blower means inside said chamber having an intake side and a discharge side, mechanism for displacing said material along a predetermined path inside said chamber, a plurality of exhaust canals spaced along said path, a plurality of inlet canals spaced along said path and positioned intermediate respective ones of said exhaust canals, said inlet canals terminating each in orifices forming nozzles for fluid discharge, first conduit means connecting said discharge side with said exhaust canals, second conduit means connecting said intake side with said inlet canals, heater means within the path of a fluid circulated by said blower means to bring the temperature of said fluid above the boiling point of said liquid to thereby cause said liquid to be vaporized, adjustable baffle means positioned in each of said exhaust canals and including at least one suction passageway, the size of said suction passageway being properly correlated with that of said orifices to ensure the existence of a predetermined pressure drop across said orifices and said suction passageway of said adjustable baffle means, and a condensing chamber, in which said drying chamber is contained.

7. An apparatus for continuously treating lengthy sheet material comprising a first chamber provided with spaced nozzles defining high pressure zones and with exhaust channels defining low pressure zones intermediate said spaced nozzles, said first chamber having an inlet and an outlet for said material whereby the latter moves along a path defined by said high pressure and said low pressure zones and for contact with a treatment fluid passing through said zones and onto and away from said material, and a second chamber in communication with said first chamber and insulated from the path of the material at the inlet and outlet thereof, said second chamber including means adapted to condense excess fluid expelled from said first chamber and to thermally insulate the latter.

8. In an apparatus according to claim 7, wherein said first chamber is substantially centrally arranged with respect to said second chamber and insulated from the latter.

9. In the method of treating liquid-impregnated running lengths of material; the steps of moving said material through an enclosure, impinging heated gaseous fluid onto said material in a first zone of said enclosure, to thereby transform said liquid in said material into vapor, withdrawing at least a part of a mixture composed of the thus spent gaseous fluid and vapor into a second zone at a pressure relatively lower than that of said first zone, recirculating said part of said mixture back to said first zone, introducing the remaining part of said mixture to a third zone within said enclosure but outside of said first and second zones, and condensing said remaining part of said mixture in said third zone, to thereby increase the difference in pressure between said second and said first zones and the speed of circulation of said fluid.

References Cited in the file of this patent

UNITED STATES PATENTS

| Number | Name | Date |
|---|---|---|
| 1,443,547 | O'Neil | Jan. 30, 1923 |
| 2,022,593 | Fuykers | Nov. 26, 1935 |
| 2,119,261 | Andrews | May 31, 1938 |
| 2,225,505 | Offen | Dec. 17, 1940 |
| 2,229,285 | Gehnrich | Jan. 21, 1941 |
| 2,286,731 | Hanson | June 16, 1942 |
| 2,306,019 | Hanson | Dec. 22, 1942 |
| 2,351,549 | Schwartz | June 13, 1944 |
| 2,384,990 | French | Sept. 18, 1945 |
| 2,462,380 | Gautreau | Feb. 22, 1949 |